(12) United States Patent
Kelly et al.

(10) Patent No.: US 10,495,534 B2
(45) Date of Patent: Dec. 3, 2019

(54) SENSOR BODY FOR A FLOW THROUGH PRESSURE SENSOR

(71) Applicant: Waters Technologies Corporation, Milford, MA (US)

(72) Inventors: Gabriel Kelly, Maynard, MA (US); Gregory Puszko, Allston, MA (US)

(73) Assignee: WATERS TECHNOLOGIES CORPORATION, Milford, MA (US)

( * ) Notice: Subject to any disclaimer, the term of this patent is extended or adjusted under 35 U.S.C. 154(b) by 94 days.

(21) Appl. No.: 15/174,013

(22) Filed: Jun. 6, 2016

(65) Prior Publication Data

US 2016/0363499 A1 Dec. 15, 2016

Related U.S. Application Data

(60) Provisional application No. 62/173,603, filed on Jun. 10, 2015.

(51) Int. Cl.
*G01L 9/00* (2006.01)
*G01F 1/36* (2006.01)

(52) U.S. Cl.
CPC ............ *G01L 9/0051* (2013.01); *G01F 1/363* (2013.01)

(58) Field of Classification Search
CPC ....... G01L 7/08; G01L 9/0051; G01L 9/0001; G01L 9/0026; G01L 19/0023;
(Continued)

(56) References Cited

U.S. PATENT DOCUMENTS 2,420,148 A * 5/1947 Ostergren ............ G01L 9/0002
338/36
3,128,628 A * 4/1964 Lebow ................. G01L 9/0002
338/36
(Continued)

FOREIGN PATENT DOCUMENTS

CN 102759426 A 10/2012
CN 103339486 A 10/2013
(Continued)

OTHER PUBLICATIONS

Hottinger Baldwin Messtechnik GmbH (HBM), Application of Well-proven Strain Gauges: Industrial Benefits, Aug. 20, 2013, azosensors.*
(Continued)

*Primary Examiner* — Justin Seo
*Assistant Examiner* — David L Singer
(74) *Attorney, Agent, or Firm* — Schmeiser, Olsen & Watts LLP; William G. Guerin

(57) ABSTRACT

A sensor body for a flow through pressure sensor includes a strain gage surface to receive a strain gage. The strain gage surface has a curved section and a length extending along a portion of a length of the sensor body. A bore wall thickness is defined as a radial distance between the bore and an outer surface of the sensor body, including the strain gage surface. The curved section can have a substantially greater bore wall thickness over its area relative to the planar surface because a greater responsive surface area for strain measurement is available. Thus a larger strain gage may be used and pressure measurement accuracy increased.

11 Claims, 11 Drawing Sheets

(58) Field of Classification Search
CPC ............ G01L 19/0627; G01L 19/0038; G01L 9/0002; G01L 9/0027; G01L 9/04–045; G01L 19/002; G01F 1/383; G01F 1/34; G01F 1/363

USPC .......................... 73/726–727, 270–721, 730

See application file for complete search history.

(56) References Cited

U.S. PATENT DOCUMENTS

| | | | | |
|---|---|---|---|---|
| 4,391,147 | A * | 7/1983 | Krempl | G01L 9/0001 310/328 |
| 4,412,454 | A * | 11/1983 | Yamashita | G01L 9/16 336/20 |
| 4,541,284 | A * | 9/1985 | Guagliumi | F02M 65/003 73/730 |
| 4,680,972 | A * | 7/1987 | Wareham | G01L 9/045 338/4 |
| 4,840,068 | A * | 6/1989 | Mayhew, Jr. | G01L 19/0023 73/706 |
| 5,031,460 | A * | 7/1991 | Kanenobu | F02M 65/003 73/114.43 |
| 5,505,092 | A * | 4/1996 | Kowalski | G01L 9/0002 338/4 |
| 6,171,253 | B1 * | 1/2001 | Bullister | A61B 5/0215 600/486 |
| 6,481,292 | B1 * | 11/2002 | Reich | A61B 5/0215 73/730 |
| 6,550,338 | B1 * | 4/2003 | Rashidi | G01L 19/0023 73/715 |
| 6,622,565 | B2 * | 9/2003 | Kincaid | G01L 7/043 239/542 |
| 6,655,216 | B1 * | 12/2003 | Aizawa | G01L 9/006 73/700 |
| 6,820,632 | B2 * | 11/2004 | Ohmi | G05D 7/0658 137/14 |
| 7,096,738 | B2 * | 8/2006 | Schumacher | G01F 1/383 73/718 |
| 7,434,473 | B1 * | 10/2008 | Allen | G01L 9/0002 73/720 |
| 8,863,578 | B2 * | 10/2014 | Kanomata | G01L 9/0002 73/700 |
| 2005/0120799 | A1 * | 6/2005 | Gysling | G01L 15/00 73/753 |
| 2005/0160828 | A1 * | 7/2005 | Hasunuma | G01L 19/0023 73/715 |
| 2005/0204822 | A1 * | 9/2005 | Schumacher | G01F 1/383 73/718 |
| 2005/0235755 | A1 * | 10/2005 | Hindman | G01L 9/0002 73/756 |
| 2006/0037408 | A1 * | 2/2006 | Peter | G01F 1/363 73/861.63 |
| 2006/0144151 | A1 * | 7/2006 | Krause | G01L 9/0027 73/715 |
| 2006/0230837 | A1 * | 10/2006 | Wilson | G01F 1/37 73/736 |
| 2007/0168150 | A1 * | 7/2007 | Hirata | G01F 1/6842 702/130 |
| 2008/0148860 | A1 * | 6/2008 | Murakami | G01L 9/0002 73/726 |
| 2012/0082569 | A1 * | 4/2012 | Kanomata | G01L 9/0002 417/63 |
| 2013/0247675 | A1 * | 9/2013 | Poissy | G01L 9/0002 73/716 |

FOREIGN PATENT DOCUMENTS

| | | | | |
|---|---|---|---|---|
| CN | 103759884 A | | 4/2014 | |
| EP | 2437040 A1 | | 4/2012 | |
| EP | 2458358 A1 | | 5/2012 | |
| JP | 59070933 A | * | 4/1984 | ............ G01L 9/0002 |
| JP | H05149813 A | | 6/1993 | |
| WO | WO-2005119181 A1 | * | 12/2005 | ............ G01F 1/363 |

OTHER PUBLICATIONS

Machine Translation of JPH05149813 (Year: 2018).*
Omega, Practical Strain Gage Measurements, Agilent Technologies (Year: 1999).*
Vishay Precision Group, Strain Gage Selection: Criteria, Procedures, Recommendations, Micro-Measurements (Year: 2010).*
"Why Bonded Foil?", djinstruments.com, DJ Instruments, 2013; 4 pages.
Pugnaire, Jean-Pierre and Richard Venable, "Selecting Pressure Sensor for Advanced Chromatography Systems", djinstruments.com, DJ Instruments, 2013; 5 pages.
Combined Search and Examination Report in counterpart UK Patent Application No. 1609620.8, dated Jan. 18, 2017; 8 pages.
Examination Report in counterpart UK Patent Application No. 1609620.8, dated Mar. 14, 2017; 4 pages.
Examination Report in United Kingdom Patent Application No. GB1609620.8, dated Nov. 29, 2017; 3 pages.
First Office Action in counterpart Chinese Patent Application No. 201610402082.1, dated Jun. 26, 2018; 13 pages.
Second Office Action in counterpart Chinese Patent Application No. 201610402082.1, dated Feb. 28, 2019; 21 pages.

* cited by examiner

SENSOR BODY FOR A FLOW THROUGH PRESSURE SENSOR

RELATED APPLICATION

This application claims priority to U.S. Provisional Application Ser. No. 62/173,603, filed on Jun. 10, 2015 entitled "SENSOR BODY FOR A FLOW THROUGH PRESSURE SENSOR", the entirety of which is incorporated by reference herein.

FIELD OF THE INVENTION

The invention relates generally to flow through pressure sensors for pressurized fluids. More particularly, the invention relates to a sensor body for a flow through pressure sensor.

BACKGROUND

High performance liquid chromatography (HPLC) and UPLC® liquid chromatography systems require a stable high pressure system flow over operational pressure ranges. By way of example, system pressures may be less than a few thousand pounds per square inch (psi) (14 megapascals (MPa)) to more than 20,000 psi (140 MPa), depending on the system capabilities and the specific application. In another example, an inject pressure used for a prime and purge cycle may be 150 psi (1.0 MPa). Pressure sensors can be used to obtain pressure measurements at multiple locations within the system for verification of proper pressure and to accurately maintain a specified system pressure.

Flow through pressure sensors are typically preferred over other types of pressure sensor for chromatography applications to minimize dead volume in the flow path. Dead volume can result in trapped sample or other fluid components and may lead to cross-contamination in subsequent chromatographic separations. Conventional flow through pressure sensors typically employ a strain gage and sensor circuitry that may include a wheatstone bridge and signal processing components. These flow through pressure sensors are limited in the range of pressure that can be measured. Using such pressure sensors over an increased pressure range can lead to premature failure and increasing amplification in the sensor circuitry can result in signal degradation. Moreover, these sensors can be difficult to manufacture, assemble and test.

Conventional flow through pressure sensors can be manufactured with different bore wall thicknesses between the plane of the strain gage surface to which the strain gage is attached and the wall of the bore that contains or passes the pressurized fluid. Each bore wall thickness corresponds to a limited range of pressures that can be accurately measured. As a result, a number of sensors of similar configuration but different bore wall thicknesses for the strain gage surface are required to cover a wide range of pressures.

SUMMARY

In one aspect, the invention features a sensor body for a flow through pressure sensor. The sensor body includes an inlet port, an outlet port and a bore having a bore surface and extending between the inlet and outlet ports along a bore axis. The sensor body has a strain gage surface having a curved section and a length extending along a portion of a length of the sensor body. The sensor body has a bore wall thickness defined as a radial distance between the bore surface and an outer surface of the sensor body where the outer surface includes the strain gage surface.

In another aspect, the invention features a sensor body for a flow through pressure sensor. The sensor body includes an inlet port, an outlet port and a bore having a bore surface and extending between the inlet and outlet ports along a bore axis. The sensor body has a strain gage surface having a length extending along a portion of a length of the sensor body, a curved section defined by a portion of a cylindrical surface having a cylindrical axis coincident with the bore axis, a first planar section extending from an edge of the curved section and a second planar section extending from an opposing edge of the curved section. The sensor body has a bore wall thickness defined as a radial distance between the bore surface and an outer surface of the sensor body where the outer surface includes the strain gage surface.

In yet another aspect, the invention features a flow through pressure sensor that includes a sensor body and a foil strain gage. The sensor body has an inlet port, an outlet port and a bore having a bore surface and extending between the inlet and outlet ports along a bore axis. The sensor body has a strain gage surface having a length extending along a portion of a length of the sensor body. The strain gage surface has a curved section, a first planar section extending from an edge of the curved section and a second planar section extending from an opposing edge of the curved section. The sensor body has a bore wall thickness defined as a radial distance between the bore surface and an outer surface of the sensor body where the outer surface includes the strain gage surface and where the bore wall thickness is a constant for the curved section of the strain gage surface.

BRIEF DESCRIPTION OF THE DRAWINGS

The above and further advantages of this invention may be better understood by referring to the following description in conjunction with the accompanying drawings, in which like reference numerals indicate like elements and features in the various figures. For clarity, not every element may be labeled in every figure. The drawings are not necessarily to scale, emphasis instead being placed upon illustrating the principles of the invention.

DETAILED DESCRIPTION

Figure 1:
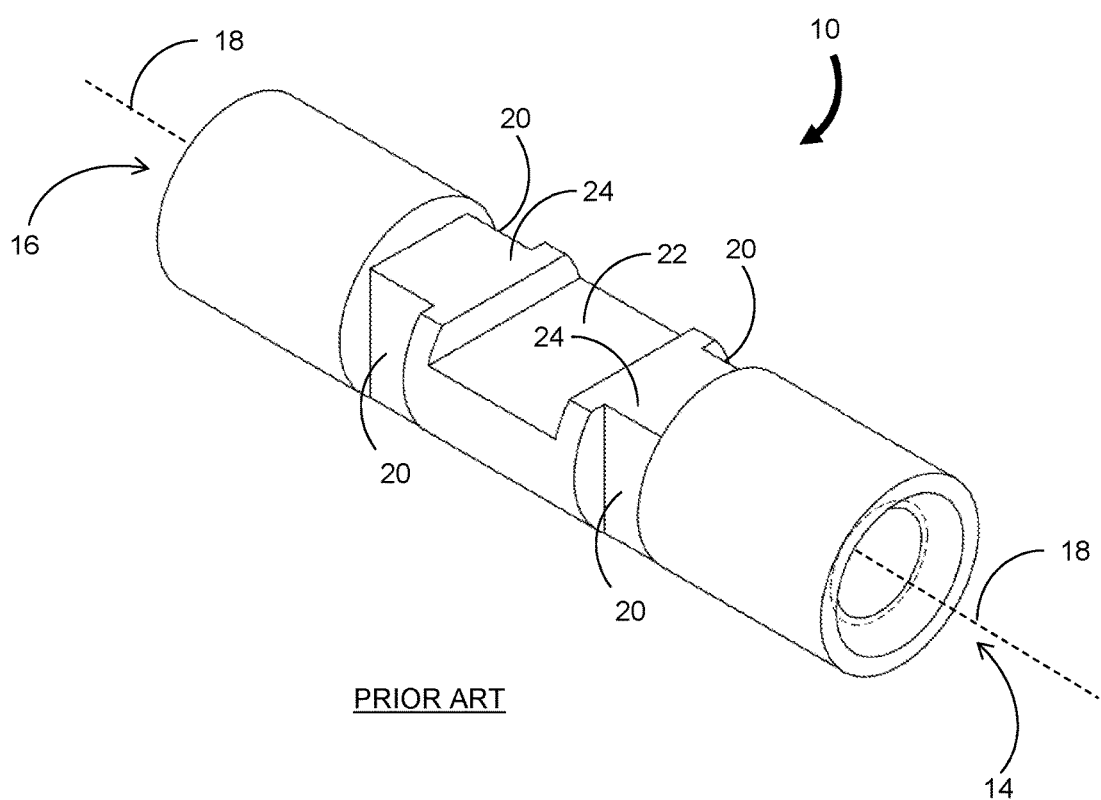
FIG. 1 is a perspective illustration of a sensor body for a conventional flow through pressure sensor.

Reference in the specification to "one embodiment" or "an embodiment" means that a particular, feature, structure or characteristic described in connection with the embodiment is included in at least one embodiment of the teaching. References to a particular embodiment within the specification do not necessarily all refer to the same embodiment.

As used herein, bore wall thickness means the radial distance between the cylindrical surface that defines a bore and the outer surface of the body surrounding the bore. Thus for a nominal cylindrical body having a central bore, the bore wall thickness corresponds to the radial distance between the outer cylindrical surface and the bore surface and to the radial distance between outer surface features in the body and the bore surface. For example, a recessed surface feature in a nominal cylindrical body will have a smaller bore wall thickness for points on the surface feature in comparison to the bore wall thickness of the outer cylindrical surface of the body.

As used herein, a sensor body means a body, object or structure which forms part of a sensor. Additional sensor components, such as sensor devices, electronic components and circuits, may be attached to the sensor body and may communicate with other sensor components on or in the sensor body, or remote to the sensor body, via electrical, optical, wireless or other form of communication.

Embodiments of a sensor body for a flow through pressure sensor in accordance with principles of the invention include a surface to receive a strain gage such as a foil strain gage. In comparison to sensor bodies for conventional flow through pressure sensors where the strain gage is limited to a narrow area on a planar surface, embodiments described herein have a larger responsive surface area over which the strain can be measured. The smaller responsive surface area of the conventional pressure sensor body requires that the strain gage be more compact and generally results in reduced measurement accuracy.

Advantages of a flow through pressure sensor based on embodiments of a sensor body described herein include a wider range of pressure that can be measured with a single pressure sensor, increased component reliability and lifetime, and increased sensitivity to pressure changes.

The present teaching will now be described in more detail with reference to embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill having access to the teaching herein will recognize additional implementations, modifications and embodiments, as well as other fields of use, which are within the scope of the present disclosure as described herein.

Figure 2A:
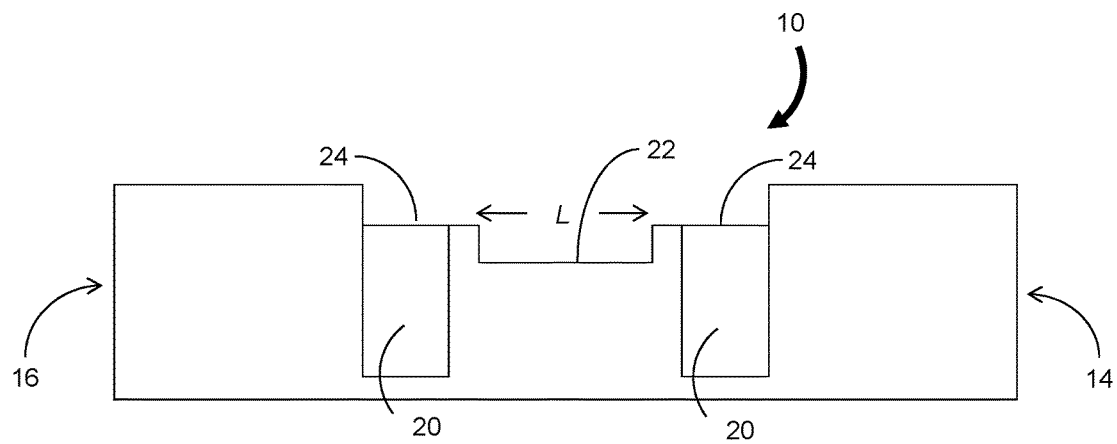
FIG. 2A, FIG. 2B and FIG. 2C are a side view, top view and cross-sectional side view, respectively, of the sensor body of FIG. 1.
Figure 2B:
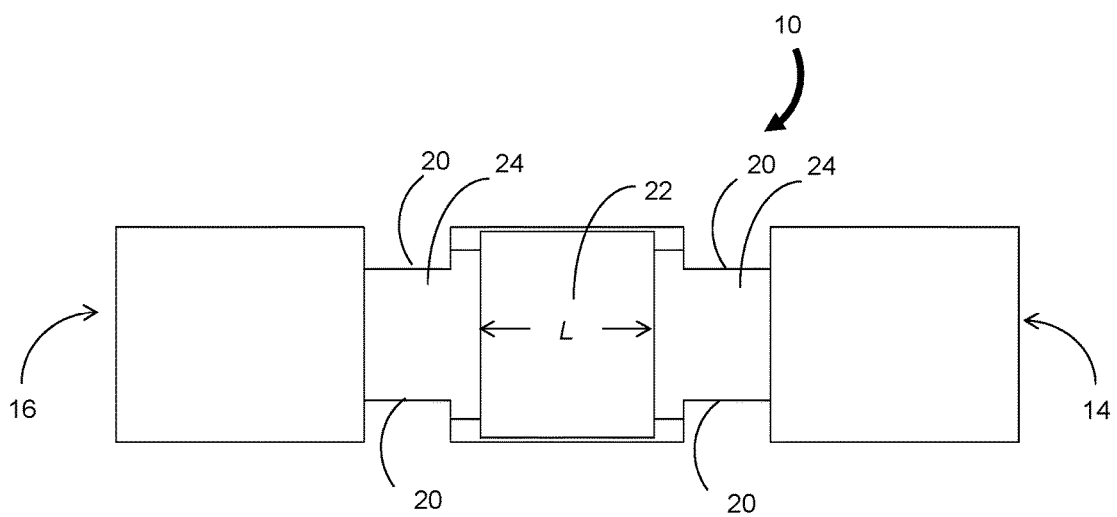
Figure 2C:
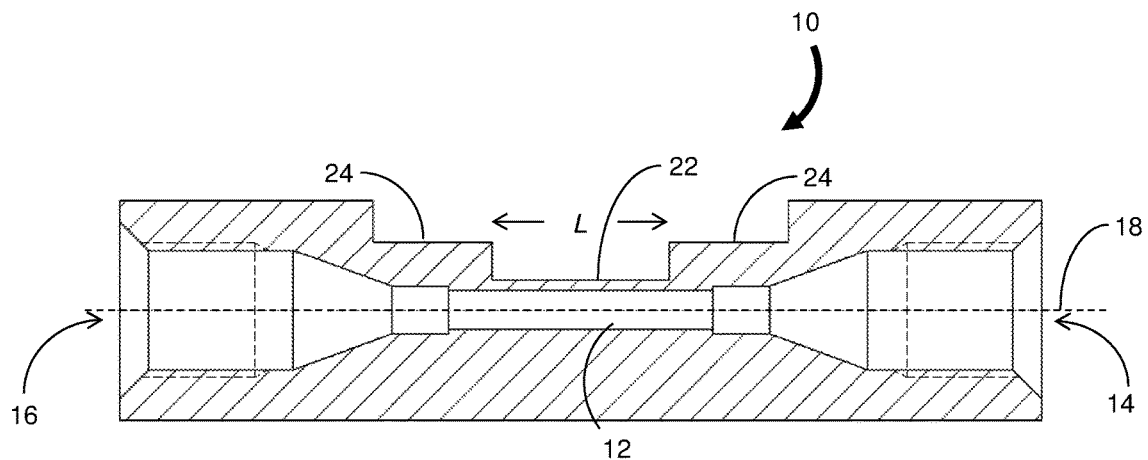

FIG. 1 shows a perspective view of a sensor body 10 for a conventional flow through pressure sensor. The flow through pressure sensor can be used for various applications, including determining the pressure of a system flow or other flow in a liquid chromatography system. The output measurement signal or output data from the pressure sensor may be used to control one or more pump systems such as pumps used to pressurize a mobile phase. FIG. 2A, FIG. 2B and FIG. 2C are a side view, top view and cross-sectional side view, respectively, of the sensor body of FIG. 1.

Referring to FIG. 1 to FIG. 2C, the sensor body 10 is approximately shaped as a cylinder. A fluid passageway 12 in the form of a central bore extends from an inlet port 14 to an outlet port 16 along a bore axis 18 which is coincident with a longitudinal axis of the body. The ports 14 and 16 are configured for coupling to fluid conduits, for example, by using compression fitting components such as a compression nut and a ferrule. Other structural features include anti-rotation recessed surfaces 20 adapted to receive an external structural element to prevent rotation of the sensor body 10 about the bore axis 18. The anti-rotation surfaces can be used to prevent the sensor body 10 from rotating and being damaged while fluid conduits are connected to the inlet port 14 or outlet port 16.

Figure 3:
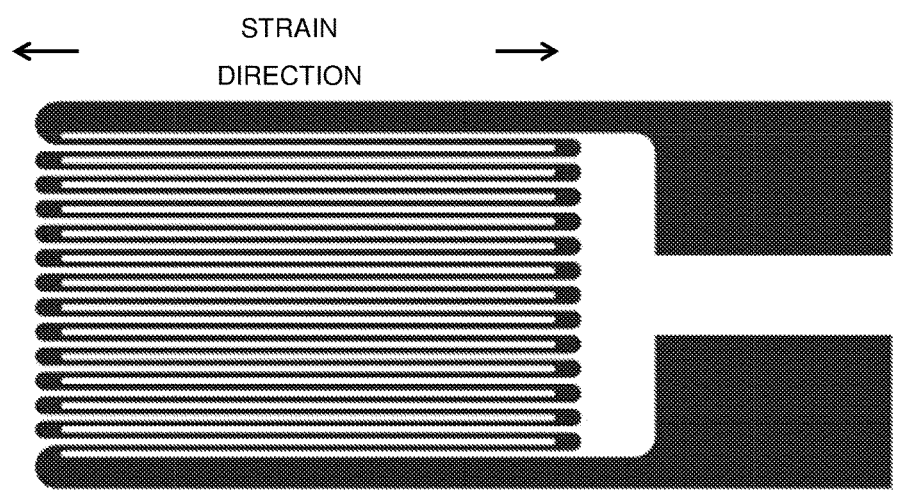
FIG. 3 is an illustration of a foil strain gage having a metallic conductor pattern adapted for sensing a strain along one axis.

The sensor body 10 includes a strain gage surface 22 and two adjacent parallel planar surfaces 24. The strain gage surface 22 is part of the outer surface of the sensor body 10 and has a flat rectangular shape. A complete flow through pressure sensor includes a foil strain gage attached to the strain gage surface 22. By way of example, FIG. 3 shows a metallic foil conductor pattern of a strain gage for measurement of strain in one (horizontal) direction. The foil strain gage also includes a flexible insulating layer (not shown) which is disposed underneath the metallic foil conductor pattern and separates the pattern from the strain gage surface 22. Referring again to FIG. 1 to FIG. 2C, a bonding agent or adhesive is used to attach the foil strain gage to the strain gage surface 22. As the surface 22 is deformed according to the pressure of the fluid in the central bore 24, the metallic foil pattern is deformed, resulting in a change in its electrical resistance. The resistance is determined by a Wheatstone bridge circuit or other electrical circuitry. A corresponding fluid pressure is determined from the measured resistance. The strain gage surface 22 may have an area that is larger than the area of the foil strain gage to allow room for wires connected to electrical contacts on the foil. Access for wires can instead, or in addition, be made using the volume available above the adjacent planar surfaces 24.

Figure 4:
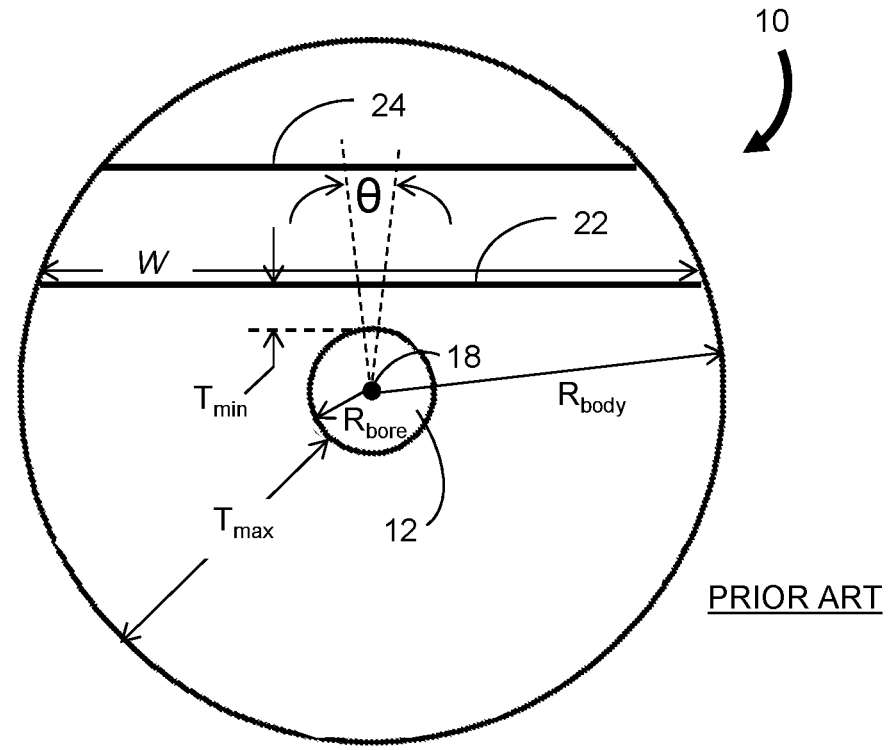
FIG. 4 is a cross-sectional view of the sensor body of FIG. 1 along the bore axis at the location of the strain gage surface.

FIG. 4 shows a cross-sectional view along the bore axis 18 in a plane that intersects the strain gage surface 22. The central bore 12 conducts the pressurized fluid in a direction along the bore axis 18 from the inlet port to the outlet port. The bore wall thickness varies from a minimum value $T_{min}$ in the vertical direction to a maximum value $T_{max}$ equal to the difference of the radius $R_{body}$ of the sensor body and the radius $R_{bore}$ of the bore 12. The maximum bore wall thickness $T_{max}$ extends over more than half the circumference of the sensor body 10. The strain is imparted primarily over a small area defined by the length L (FIG. 2B) along the strain gage surface 22 and over a portion of the width W corresponding to a narrow angle θ about the bore axis 18 over which the bore wall thickness is approximately $T_{min}$.

Figure 5:
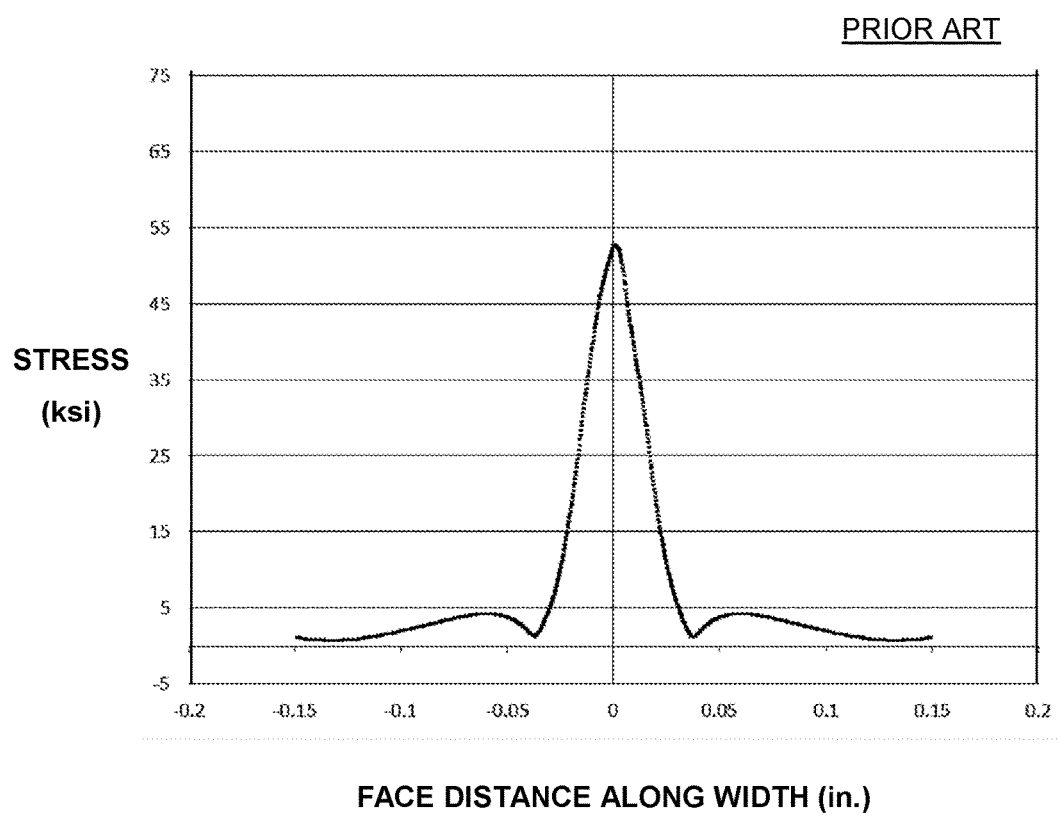
FIG. 5 is plot of the stress as a function of distance along the width of the strain gage surface for the sensor body of FIG. 1.

Referring also to FIG. 5, the plot 42 indicates the stress imparted along the strain gage surface 22 in response to a pressure of 20,000 psi (140 MPa) according to position along the face distance, or width W, as measured from the midpoint of the width W. A high but narrow stress peak is evident at the center of the width W at a position corresponding to the minimum bore wall thickness $T_{min}$. This stress profile extends into the plane of the figure in a direction corresponding to the length L of the strain gage surface 22 (FIG. 2B).

The limited area of the strain gage surface 22 that experiences significant strain results in a tight tolerance for the positioning of the foil strain gage and requires a difficult calibration to be performed. To improve the sensitivity of the pressure sensor for measurement of lower pressures, the minimum bore wall thickness $T_{min}$ can be reduced; however, the result may be a reduced lifetime due to bursting or other structural failure.

Figure 6:
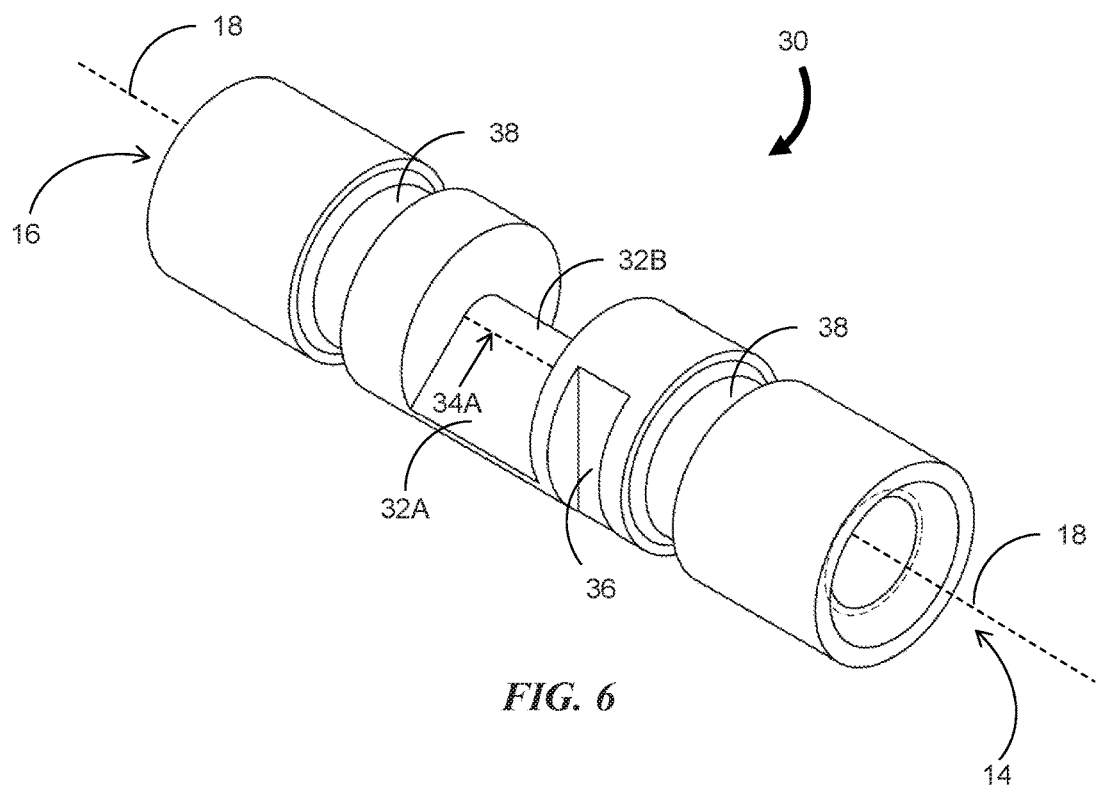
FIG. 6 is a perspective illustration of a sensor body for a flow through pressure sensor according to an embodiment of the invention.
Figure 7A:
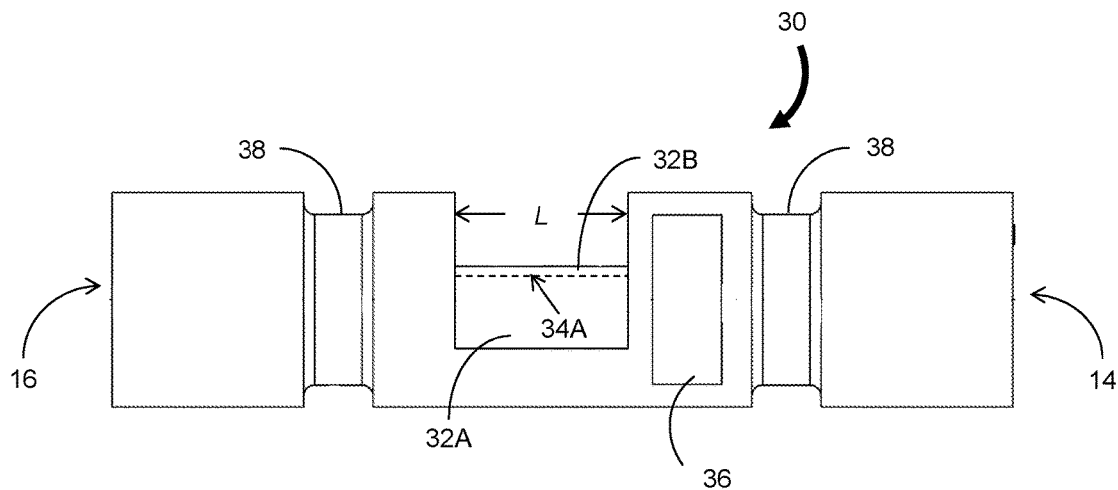
FIG. 7A, FIG. 7B and FIG. 7C are a side view, top view and cross-sectional side view, respectively, of the sensor body of FIG. 6.
Figure 7B:
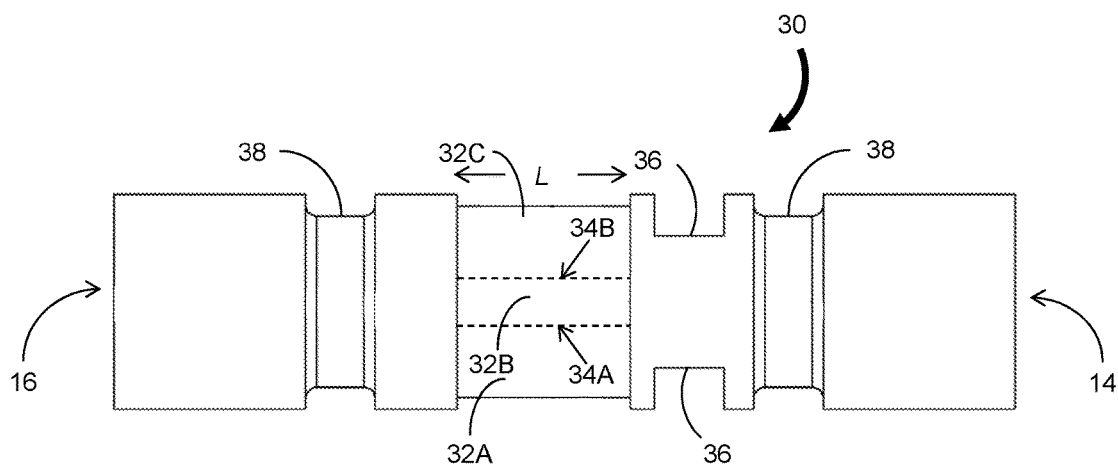
Figure 7C:
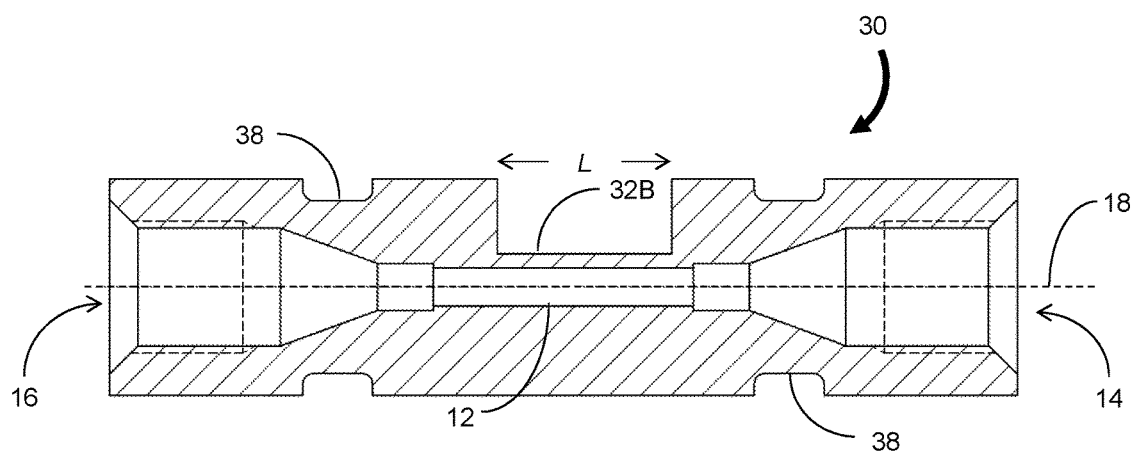

FIG. 6 shows a perspective illustration of an embodiment of a sensor body 30 for a flow through pressure sensor in accordance with the invention. FIG. 7A, FIG. 7B and FIG. 7C are a side view, top view and cross-sectional side view, respectively, of the sensor body 30 of FIG. 6. The sensor body 30 is preferably fabricated from high purity titanium alloys; however, in other embodiments, the sensor body 30 is fabricated from a different metal, such as a stainless steel alloy, or a non-metal material that is compatible with the pressurized fluid and which is adapted for a cyclical strain load that does not exceed the elastic deformation limits of the material.

The sensor body 30 is similarly shaped to the sensor body 10 of FIG. 1 although only one pair of anti-rotation surfaces 36 is provided. In addition, two annular grooves 38 are included and are configured to receive O-rings to enable a seal between the outer surface of the sensor body 30 and a surrounding circumferential surface of a separate structure or body.

The strain gage surface 32 is significantly different from the counterpart surface 22 in the conventional sensor body 10 of FIG. 1. In particular, the strain gage surface 32 includes a first planar section 32A that seamless merges with and extends from an edge 34A of a curved section 32B. A second planar section 32C seamlessly merges with and extends from an opposing edge 34B on the other side of curved section 32B. The curved section 32 B extends circumferentially over an angle of approximately 90° relative to the bore axis 18.

Figure 8:
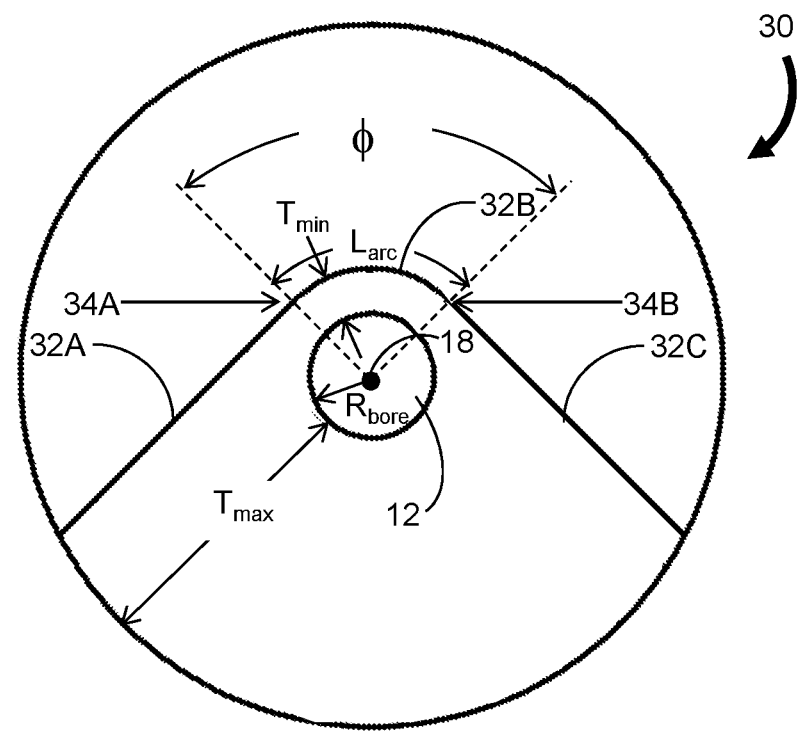
FIG. 8 is a cross-sectional view of the sensor body of FIG. 6 along the bore axis at the location of the strain gage surface.
Figure 9A:
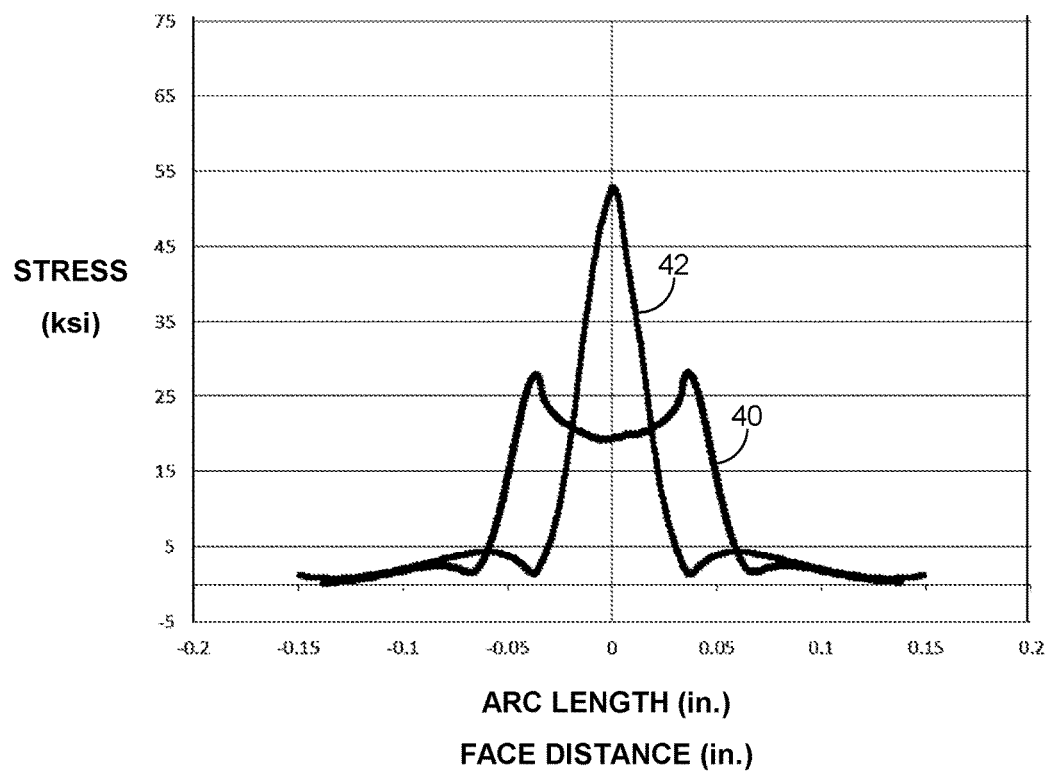
FIG. 9A shows a plot of the stress as a function of distance along the arc length of the strain gage surface for the sensor body of FIG. 6 superimposed on the plot of FIG. 5 where the minimum bore wall thickness of the sensor body of FIG. 6 is twice the minimum bore wall thickness of the sensor body represented by FIG. 5.
Figure 9B:
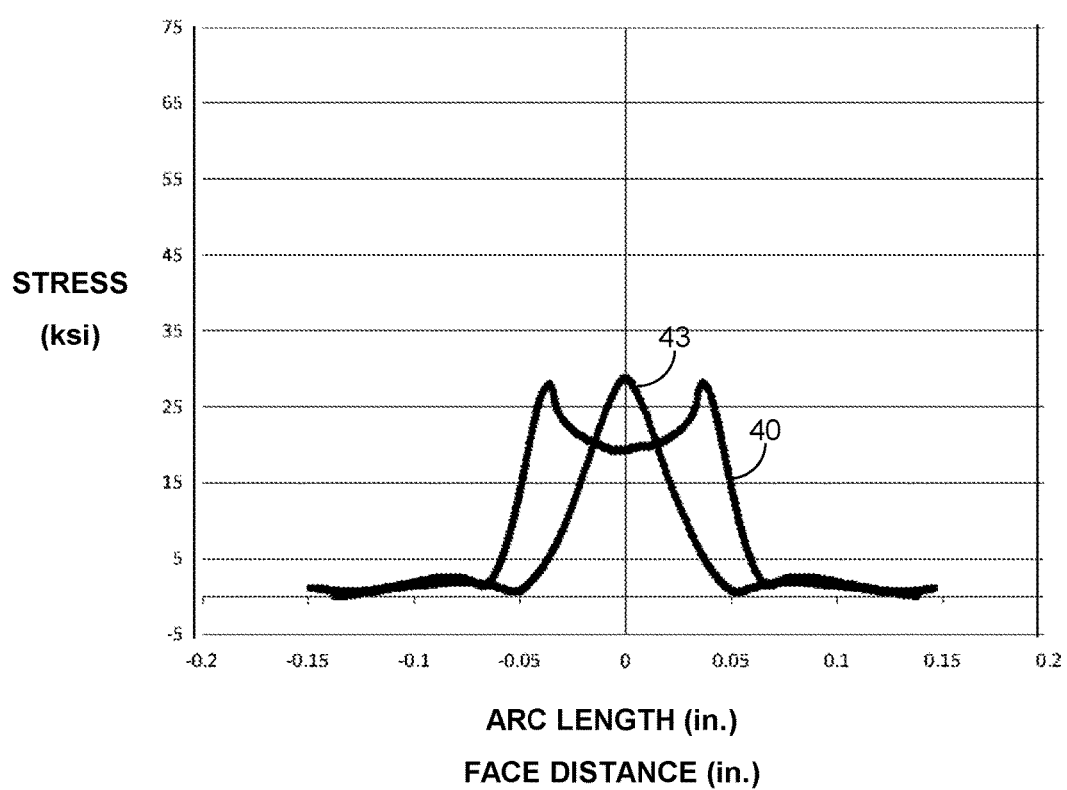
FIG. 9B shows a plot of the stress as a function of distance along the arc length of the strain gage surface for the sensor body of FIG. 6 superimposed on the plot of FIG. 5 where the minimum bore wall thickness for the sensor bodies represented by both plots are the same.

FIG. 8 is a cross-sectional view along the bore axis 18 in a plane that intersects the strain gage surface 32 and FIG. 9A shows a plot 40 of the stress imparted along the arc length $L_{arc}$ of the strain gage surface 32 in response to a pressure of 20,000 psi (140 MPa). The stress plot of FIG. 5 which corresponds to the strain gage surface 22 of the sensor body 10 of FIG. 1 with half the minimum bore wall thickness $T_{min}$ of the sensor body 30 of FIG. 6 is superposed as plot 42 for comparison. Thus the plot 42 exhibits approximately twice the peak stress of plot 40. The greater bore wall thickness of sensor body 30 results in a greater margin of safety with regard to fatigue stress while providing a greater measureable response area to allow measurement of the same pressure as sensor body 10. FIG. 9B shows the stress plot 40 of FIG. 9A and also shows a plot 43 of the stress for sensor body 10 if its minimum bore wall thickness $T_{min}$ were increased to be equal to that of sensor body 30. Thus a thicker bore wall on sensor body 10 results in a greater margin of safety at the expense of reduced sensitivity to pressure.

Plot 40 shows that a broad stress region is evident across the arc length $L_{arc}$ of sensor body 30, corresponding to the minimum bore wall thickness $T_{min}$ which exists over the full area of curved section 32B and extends over an angle ϕ of approximately 90° with respect to the bore axis 18. In other embodiments, the angle ϕ can be different. For example, to achieve improved sensitivity without changing the minimum bore wall thickness $T_{min}$, the curved section 32B can extend over a substantially larger angle ϕ.

Figure 10:
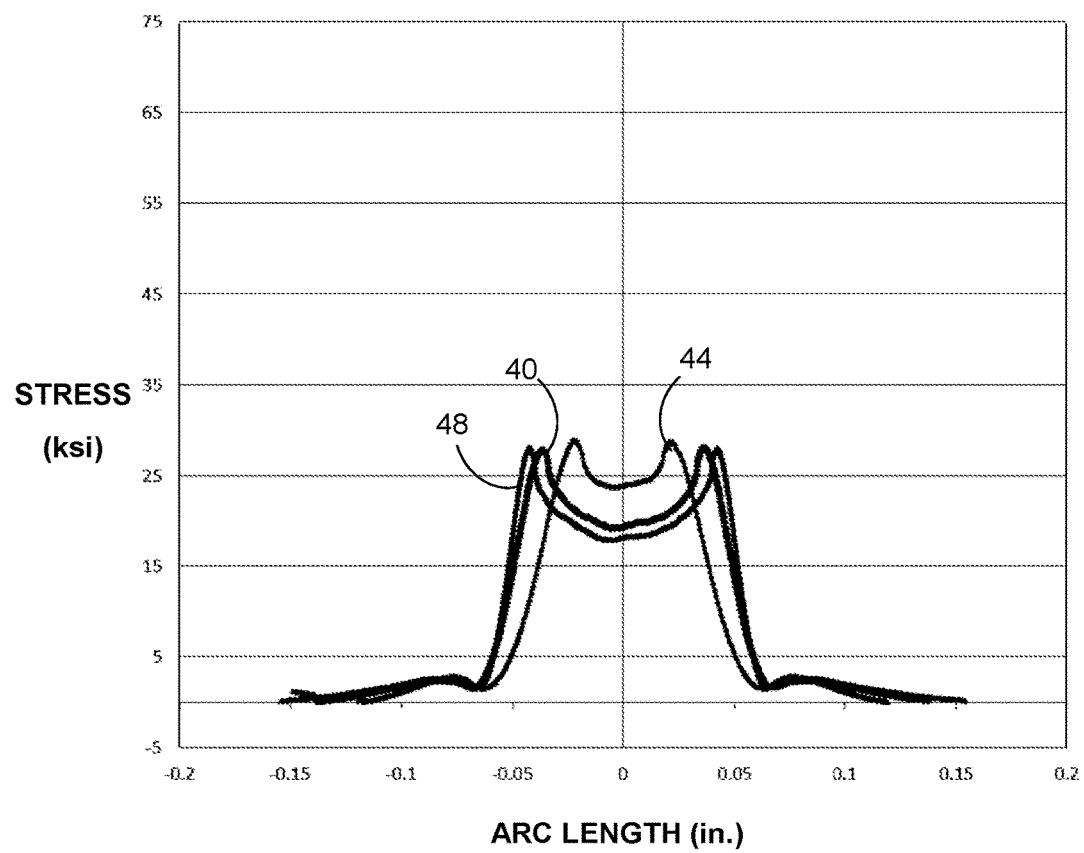
FIG. 10 are plots of the stress as a function of distance along the arc length of the strain gage surface for the sensor body of FIG. 6 according to three different curved sections of the strain gage surface, each extending over a different angle with respect to the bore axis.

FIG. 10 shows plots 44, 40 and 48 of the stress as a function of arc length $L_{arc}$ for three different angles ϕ of 60°, 90° and 135°, respectively, in response to a pressure of 20,000 psi (140 MPa). A larger angle ϕ may be preferred when the sensor body has a central bore with a smaller diameter to compensate for the resulting increased bore wall thickness.

In effect, the strain gage surface 32 shown in FIG. 8 is equivalent to a bending of the strain gage surface 22 shown in FIG. 4 about the bore axis 18. The foil strain gage is flexible and takes the general shape of the surface 32 to which it is bonded. In some embodiments, the width of the foil strain gage is narrower than the arc length $L_{arc}$ of the curved section 32B. In other embodiments, the foil strain gage is wider that the arc length $L_{arc}$ of the curved section 32B and extends onto at least a portion of one or both of the planar sections 32A and 32C.

Although the stress change at the strain gage surface 32 due to a pressure change is generally less than the stress change for the same pressure change for the narrow band of stress on the strain gage surface 22 of sensor body 10 (FIG. 1) at a similar minimum bore wall thickness, the substantially larger responsive area of the strain gage surface 32 for sensor body 30 results in a significantly greater cumulative effect and yields a substantially greater electrical response from the foil strain gage for the same pressure change. More specifically, the arc length $L_{arc}$ of the curved section 32B which has the minimum bore wall thickness $T_{min}$ is given by $$L_{arc}=(\phi/360)*2\pi(R_{bore}+T_{min}).$$

Thus the sensing area of the strain gage surface 32 is substantially greater than the sensing area of a conventional sensor body. The sensing area is approximately given by the product of the arc length $L_{arc}$ and the length of the strain gage surface 32 (FIG. 7B). As a result, the sensor body 30 equipped with the same foil strain gage as a conventional sensor body can be used to monitor a wider range of pressures. Alternatively, the sensor body 30 can be used as part of a flow through pressure sensor having increased accuracy for a fixed pressure range.

Advantageously, the sensor body 30 may be manufactured without the tight tolerance requirements of a conventional sensor body as the minimum wall thickness $T_{min}$ can be greater due to the substantially greater responsive area of the strain gage surface 32. As a consequence, other forms of manufacturing tools may be employed and manufacturing time and costs reduced.

Although the embodiments of a sensor body described above include a strain gage surface that includes a curved section defined as a portion of a cylindrical surface having a cylindrical axis that is coincident with the bore axis, the strain gage surfaces of other embodiments can include other non-planar sections so that the surface area contributing to the output signal of the foil strain gage is substantially greater than that of a conventional sensor body. For example, the curved section 32B in FIG. 7 is shown in the plane of the figure as an arc extending through one-quarter of the circumference of a circle, the curved section may instead be defined by a portion of a parabola, a portion of an ellipse or another non-linear segment that results in an increased responsive area.

As described above, the number of sensor bodies 30 that can be used to cover a wide range of pressure is reduced using the illustrated embodiment. Each sensor body 30 has a minimum bore wall thickness $T_{min}$ that corresponds to the pressure range for its intended use although the circuitry configuration and components for all sensor bodies can be the same. Moreover, in some embodiments, the minimum wall thickness $T_{min}$ used for the sensor body 30 is greater than that used with a conventional sensor body for the same pressure range, resulting in improved reliability and increased lifetime.

While the invention has been shown and described with reference to specific embodiments, it should be understood by those skilled in the art that various changes in form and detail may be made therein without departing from the spirit and scope of the invention as recited in the accompanying claims.

What is claimed is:

1. A sensor body for a flow through pressure sensor, the sensor body comprising a unitary object having an inlet port, an outlet port and a bore having a bore surface and extending between the inlet and outlet ports along a bore axis, the unitary object having an outer surface that includes a strain gage surface having a curved section, a first planar section, a second planar section and a length extending along a portion of a length of the unitary object, wherein the first and second planar sections seamlessly merge with and extend from opposing edges of the curved section, the unitary object having a bore wall thickness defined as a radial distance between the bore surface and the outer surface, wherein the bore wall thickness is a constant for the curved section of the strain gage surface and wherein the bore wall thickness of each of the first and second planar sections is greater than the bore wall thickness of the curved section.

2. The sensor body of claim 1, wherein the curved section is defined by a portion of a cylindrical surface having a cylindrical axis coincident with the bore axis.

3. The sensor body of claim 1 further comprising a strain gage attached to the strain gage surface, the strain gage configured for sensing a strain in the sensor body in response to a pressure of a fluid in the bore.

4. The sensor body of claim 3, wherein the strain gage is a foil strain gage.

5. The sensor body of claim 1, wherein the sensor body is formed of one of titanium, a titanium alloy, stainless steel and a stainless steel alloy.

6. A sensor body for a flow through pressure sensor, the sensor body comprising a unitary object having an inlet port, an outlet port and a bore having a bore surface and extending between the inlet and outlet ports along a bore axis, the unitary object having a strain gage surface having a length extending along a portion of a length of the unitary object, a curved section defined by a portion of a cylindrical surface having a cylindrical axis coincident with the bore axis, a first planar section seamlessly merging and extending from an edge of the curved section and a second planar section seamlessly merging and extending from an opposing edge of the curved section, the unitary object having a bore wall thickness defined as a radial distance between the bore surface and an outer surface of the unitary object, wherein the outer surface includes the strain gage surface and wherein the bore wall thickness is a constant for the curved section of the strain gage surface.

7. The sensor body of claim 6 further comprising a strain gage attached to the strain gage surface, the strain gage configured for sensing a strain in the sensor body in response to a pressure of a fluid in the bore.

8. The sensor body of claim 7, wherein the strain gage is a foil strain gage.

9. The sensor body of claim 6, wherein the bore wall thickness of each of the first and second planar sections is greater than the bore wall thickness of the curved section.

10. The sensor body of claim 6, wherein the sensor body is formed of one of titanium, a titanium alloy, stainless steel and a stainless steel alloy.

11. A flow through pressure sensor comprising:
a sensor body comprising a unitary object having an inlet port, an outlet port, and a bore having a bore surface and extending between the inlet and outlet ports along a bore axis, the unitary object having a strain gage surface having a length extending along a portion of a length of the unitary object, the strain gage surface having a curved section, a first planar section seamlessly merging and extending from an edge of the curved section and a second planar section seamlessly merging and extending from an opposing edge of the curved section, the unitary object having a bore wall thickness defined as a radial distance between the bore surface and an outer surface of the unitary object, wherein the bore wall thickness is a constant for the curved section of the strain gage surface; and
a foil strain gage attached to the strain gage surface and configured for sensing a strain in the unitary object in response to a pressure of a fluid in the bore.

* * * * *